Figure 1:
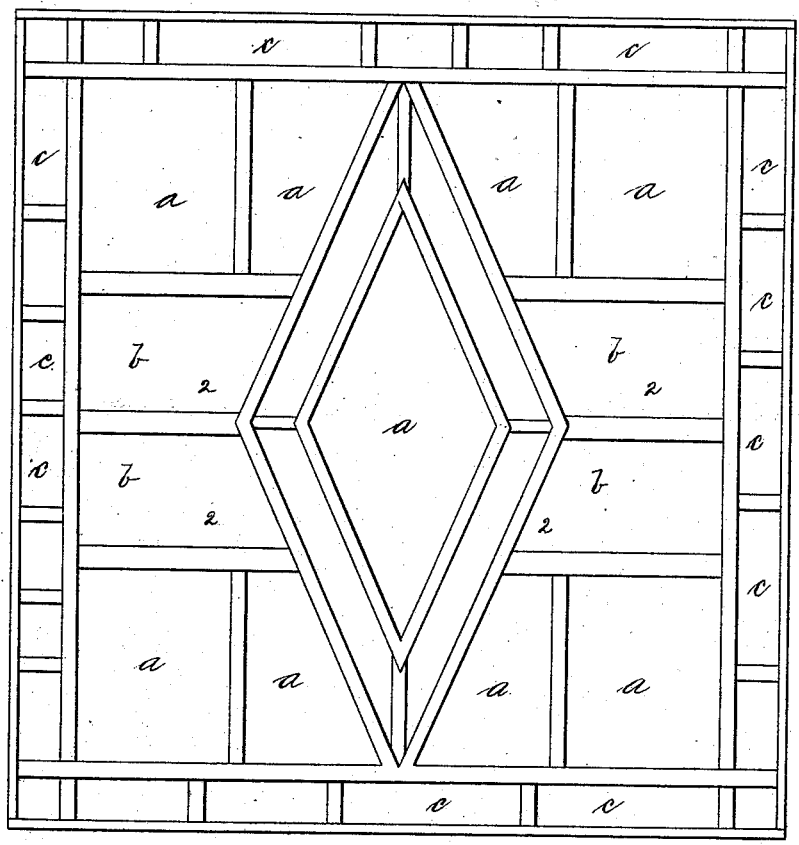

J. La FARGE.
Colored Glass Window.

No. 224,831. Patented Feb. 24, 1880.

Witnesses.
S. F. Connor.
Jos. P. Livermore.

Inventor.
John La Farge
by Crosby & Gregory,
Attys.

UNITED STATES PATENT OFFICE.

JOHN LA FARGE, OF NEWPORT, RHODE ISLAND.

COLORED-GLASS WINDOW.

SPECIFICATION forming part of Letters Patent No. 224,831, dated February 24, 1880.

Application filed November 10, 1879.

*To all whom it may concern:*

Be it known that I, JOHN LA FARGE, of the city and county of Newport, and State of Rhode Island, have invented an Improvement in Colored-Glass Windows, of which the following description, in connection with the accompanying drawings, is a specification.

This invention relates to improvements in colored-glass windows.

The object of my invention is to obtain opalescent and iridescent effects in glass windows, to insure translucency of the glass used therein and lessen complete transparency, which is a great fault in ordinary glass windows, the translucency of the class of glass employed by me softening the light, and, by reason of its unevenness of structure and formation, the direct passage of rays of light and the tendency of the said rays to focus are prevented.

By this my invention glass windows possessing the advantageous qualities hereinbefore referred to may be made at less cost than by the use of a good quality of stained or colored glass.

The colors and effects of light produced in accordance with my discovery and improvements are greater than can be gained in any way known to me; but some of the same effects might be secured by the employment of thin sheets of mother-of-pearl, or thin laminæ of precious stones, such as onyx and alabaster, which substances I am informed have been employed in rare instances in other countries.

In my studies, both as architect and artist, I have aimed to overcome the objections commonly urged against colored-glass windows and to give to them new qualities and properties of a pleasing nature, to thereby increase the use of colored-glass windows and give additional variety and beauty to public edifices and private dwellings; and by experiment I have discovered that opalescent and iridescent effects may, in an eminent degree, be obtained for windows by the employment of that class of glass known as "opal glass," it being commonly used for table-ware and fancy articles, such as boxes, but never for windows. This opal glass, in its customary form, is of a dead-white color, and in appearance resembles porcelain, for which it is employed as a substitute.

Opal glass, as at present improved and refined and employed in articles for table use and boxes, is not, for use in windows, as desirable and pleasing, as to its effects of color, as the more transparent quality, which was first made. This opal glass will be more or less opaque or milky in parts, according to the proportion of the insoluble mass deposited or contained in it. This effect is usually produced with peroxide of tin or stannic acid, antimonic acid, chloride of silver, phosphate of lime, or bone-ashes. These different materials, mixed with the usual sand and potash or with powdered glass, give a white precipitate, consequently a glass of a milky or yellowish white. By regulating the quantities of these materials the glass may be made translucid or absolutely opaque, but the latter would not answer for my purpose.

I am enabled, by checking or graduating the amount of light in this way, to gain effects as to depth, softness, and modulation of color which has not been before gained by the use of colored glass alone, and windows made in accordance with my invention may, by the use of opal or translucent and colored glass, be made to show a variety of shades of color not before gained by transparent glass.

By varying the opacity of any portion of the glass by any of the ways herein described, it is obvious that I may gain great advantage as to realistic representation of natural objects, as, for instance, the clouding of a blue sky with more or less intensity of white cloud. These opalescent and iridescent effects may be enhanced by the greater or less smoothness of one or both surfaces of the opalescent glass, and by its thickness, and the glass may be waved, corrugated, or roughened in molds, or be hammered or rolled, or be stamped or treated to accord with the design or surface-finish required for the glass. This operation may be performed while the glass, in heated state, is supported on a suitable bed, as is well understood by workers in glass.

In order to secure other effects of light and color than those so far referred to, and to retain the advantages due to moderate translucency, and enhance both depth and quality of color, I have found by experiment that I may take colored glass of either the most common class of window-glass, if the item of cost is essential, or may take any better class of colored glass at hand, and either plate or roll upon it, or mix with it in molten state, the opal-glass compound hereinbefore described, the coloring being any which can be formed in glass by any of the usual methods carried on in its manufacture; and it is also obvious, instead of employing the opal glass as a coating or mixture for the colored glass in its heated or molten state, that I may add to the said molten glass the component parts of which the opal-glass compound is formed, or vice versa.

In some instances I find it very advantageous to back colored glass of ordinary construction with independent pieces of opal glass, one or more layers of either being used, according to the effect desired.

On a cloudy or dark day a window containing opal glass shows such a quantity of color and appears as if lighted by the sun. In the day-time this opal-glass window seen from outside, in variety of color, resembles mosaic work and presents a highly ornamental effect, while ordinary colored-glass windows are not ornamental.

Under artificial lights in buildings ordinary colored-glass windows become very dark at the interior of the apartment of which they form a part, which, for dwelling-houses, is very unpleasant and cold in appearance, and this dark appearance can be obviated only by the use of curtains, shades, or hangings; but by the use of the opal or white glass at the inside of the windows the wall in which they are set will not appear dark, but, on the contrary, under artificial illumination of the interior of the apartment, will appear of light color.

I desire it to be understood that I lay no claim to any improvement in the art of glass-making, either in translucent, opal, or colored glass.

Figure 2:

Figure 1 represents, in front view, a window containing panes of glass in accordance with my invention; Fig. 2, a cross-section thereof, and Fig. 3 a piece of common colored glass coated with a lamina of opal glass.

In the drawings, $a$ represents panes of opal glass; $b$, panes composed of layers of opal glass (2) and colored glass (3) superimposed, and $c$ panes composed of colored and translucent glass compounds mixed.

Figure 3:

In Fig. 3 the thicker layer $e$ is to represent colored window glass with a layer, $f$, of opal glass plated or rolled thereon, this form of glass being preferable in many instances to the independent layers 2 3, as in panes $b$.

I claim—

1. As an improved article of manufacture, a window having panes of translucent opal glass, substantially as and for the purposes described.

2. In a decorative or colored-glass window, panes composed of translucent opal and colored glass, as and for the purpose described.

In testimony whereof I have signed my name to this specification in the presence of two subscribing witnesses.

JNO. LA FARGE.

Witnesses:
GEO. W. GREGORY,
N. E. WHITNEY.